United States Patent
Sanpei et al.

(10) Patent No.: US 6,463,399 B1
(45) Date of Patent: Oct. 8, 2002

(54) APPARATUS AND METHOD FOR DETECTING ROTATION ANGULAR SPEED AND AUTOMOBILE USING THE APPARATUS

(75) Inventors: Yoshio Sanpei, Miyagi-ken (JP); Hironori Kato, Miyagi-ken (JP); Toshiyuki Hoshi, Rochester, MI (US)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/947,156

(22) Filed: Sep. 5, 2001

(30) Foreign Application Priority Data

Sep. 5, 2000 (JP) ......................................... 2000-273552

(51) Int. Cl.[7] ............................. G01B 21/22; G01D 5/36
(52) U.S. Cl. ...................... 702/145; 201/45; 73/862.08
(58) Field of Search ................ 702/145; 73/862.08, 73/862.322; 701/41, 45; 280/5.51; 340/465; 318/489

(56) References Cited

U.S. PATENT DOCUMENTS 6,064,166 A    5/2000  Kaji ........................... 318/489
6,282,968 B1 *  9/2001  Sano et al. .................. 73/118.1
6,314,355 B1 * 11/2001  Mizuta et al. ............... 280/5.51

FOREIGN PATENT DOCUMENTS

JP          114116 A  *  4/2001
JP          174289 A  *  6/2001
JP          241942 A  *  9/2001

* cited by examiner

Primary Examiner—Kamini Shah
(74) Attorney, Agent, or Firm—Brinks Hofer Gilson & Lione

(57) ABSTRACT

A rotation angular speed detection apparatus that accurately detects a low rotation angular speed of a rotating body includes: a receiving part for receiving rotation angles at predetermined time intervals from a rotation angle sensor that detects rotation angles of a rotating body; a storage part for storing received rotation angles; and a control part. When the difference between a first arbitrary angle stored and a second angle stored before the first angle is less than a predetermined value, the control part determines, from the stored rotation angles, a third angle in which a difference between the first angle and the third angle is more than the predetermined value, and the control part divides the difference between the first angle and the third angle by the time required from storing of the third angle to storing of the first angle to detect a rotation angular speed.

9 Claims, 4 Drawing Sheets

APPARATUS AND METHOD FOR DETECTING ROTATION ANGULAR SPEED AND AUTOMOBILE USING THE APPARATUS

BACKGROUND OF THE INVENTION

1. Field of the Invention

The present invention relates to an apparatus and method for detecting a rotation angular speed and to an automobile using the apparatus. In particular, the present invention relates to an apparatus and method for detecting a rotation angular speed to reduce a measurement error when a rotation angular speed is low, and to an automobile using a rotation angular speed of a steering wheel detected by the apparatus to stabilize a vehicle.

2. Description of the Prior Art

In recent years, an automobile has been performing total vehicle stability control such as braking control, suspension control and traction control for stabilizing a vehicle so that the driver can drive the automobile safely and comfortably. The total vehicle stability control detects the rotation angle of a steering wheel by a rotation angle sensor, detects a rotation angular speed (a rotating speed) of the steering wheel by a rotation angular speed detection apparatus from a traveling amount of the detected rotation angle per predetermined time, and predicts the traveling direction intended by the driver (the direction to finish turning the steering wheel) by the detected rotation angular speed so as to perform the vehicle stability control based on the prediction.

A prior art rotation angular speed detection apparatus has a receiving part for receiving an angular signal from a rotation angle sensor outputting an angular signal corresponding to the rotation angle of a rotating body, for example, at intervals of 400 microseconds, a storage part for storing a first angle based on the received angular signal, a sending part for sending the first angle at intervals of 10 milliseconds, and a control part for determining a difference between the first angle stored immediately before sending the same and a second angle stored immediately before sending the first angle which is then multiplied by 100 (1 second/10 milliseconds) so as to detect a rotation angular speed (degrees/sec)

When the rotation angular speed detection apparatus is used in an automobile, an angular signal from an angle sensor outputting an angular signal corresponding to the rotation angle of a steering wheel is detected described above. Then, a rotation angular speed signal based on the detected rotation angular speed is calculated, for example, at intervals of 10 milliseconds to send the result to vehicle stability control to stabilize the vehicle.

Between the rotation angle actually rotating the rotating body and the rotation angle stored in the storage part, there are caused a measurement error of the rotation angle due to the accuracy of the rotation angle sensor, an error at reception due to electric delay, and an error at conversion of an analog signal to a digital signal. It is difficult to remove these errors. For example, when the total of these errors is a maximum of 0.2°, a rotation angular speed is calculated by the abovementioned calculation, an error of 20 (degrees/sec) may be caused. This error has an error rate of 2% when the rotating body is rotated largely and for example, a difference of the rotation angles at intervals of 10 ms is 10° (1000 degrees/sec), which is not very important. This error has an error rate of 20% when the rotation amount of the rotating body is relatively small and for example, a difference of the rotation angles at intervals of 10 ms is 1° (100 degrees/sec). In this manner, when the rotation angular speed for actually rotating the rotating body is low, the error rate. of the detected rotation angular speed is very high.

When the rotation angular speed detection apparatus is used in an automobile, the rotation angular speed of the steering wheel detected by the rotation angular speed detection apparatus is sent to the vehicle stability control system of the. automobile. For example,, when the steering wheel is turned at a small angle when driving the automobile at high speed on an expressway, the error of the rotation angular speed sent to the vehicle stability control system is increased. The vehicle stability control misjudges that the steering wheel is turned abruptly and performs unnecessary traction control, so that the vehicle is unstable.

SUMMARY OF THE INVENTION

The present invention solves the problem above and accordingly, an object of the present invention is to provide an apparatus and method capable of detecting a rotation angular speed to reduce an error when the rotation angular speed for rotating a rotating body is low, and an automobile which can be driven more safely when a steering wheel is turned slowly.

To solve the foregoing problems, in the present invention, a rotation angular speed detection apparatus comprises: a receiving part for receiving an angular signal at predetermined time intervals from a rotation angle sensor for detecting a rotation angle of a rotating body with respect to the reference angle; a storage part for storing the rotation angle based on the received angular signal; and a control part for dividing a difference between a first arbitrary angle of the rotation angles stored in the storage part and a second angle stored before the first angle by the time required from storing of the second angle to storing of the first angle so as to detect a rotation angular speed; wherein when the difference between the first angle and the second angle is less than a predetermined value, the control part determines, from the angles stored in the storage part, a third angle stored before the second angle in which a difference between the first angle and the third angle is more than the predetermined value, and wherein the control part divides the difference between the first angle and the third angle by the time required from storing of the third angle to storing of the first angle so as to detect a rotation angular speed.

Such a construction can divide the difference between the rotation angles so as to reduce an error and detect a rotation angular speed having high accuracy.

In the present invention, when an angle in which a difference between the first angle and the angle is more than the predetermined value is not present in the rotation angles stored in the storage part, the control part selects an arbitrary rotation angle of the rotation angles stored in the storage part as a fourth angle, and divides a difference between the first angle and the fourth angle by the time required from storing of the fourth angle to storing of the first angle so as to detect a rotation angular speed.

Such a construction can detect a rotation angular speed having high accuracy when the rotating body is hardly rotated. In addition, the control part selects the rotation angle stored at the first of the rotation angles stored in the storage part as the fourth angle, and divides a difference between the first angle and the fourth angle by the time required from storing of the fourth angle to storing of the first angle so as to detect a rotation angular speed. A rotation angular speed having higher accuracy can be detected.

In the present invention, when a sign of the difference between the first angle and the second angle is reversed from a sign of the difference between the second angle and the rotation angle stored immediately before the second angle, the control part erases the rotation angles before the second angle of the rotation angles stored in the storage part.

Such a construction can detecta rotation angular speed having high accuracy when the forward/rearward rotation of the rotating body is repeated frequently in a short time.

An automobile of the present invention comprises: the rotation angular speed detection apparatus; and a vehicle stability control system for stabilizing a vehicle; wherein the rotation angular speed detection apparatus receives an angular signal from an angle sensor detecting a rotation angle of a steering wheel so as to detect a rotation angular speed of the steering wheel, and wherein a rotation angular speed signal based on the detected rotation angular speed is sent to the vehicle stability control system.

Such a construction can provide an automobile which can predict the traveling direction intended by the driver more precisely and permits suitable vehicle stability control.

DESCRIPTION OF THE PREFERRED EMBODIMENTS

The apparatus and method for detecting a rotation angular speed according to the present invention will be described hereinbelow with reference to FIGS. 1 to 2.

Figure 1:
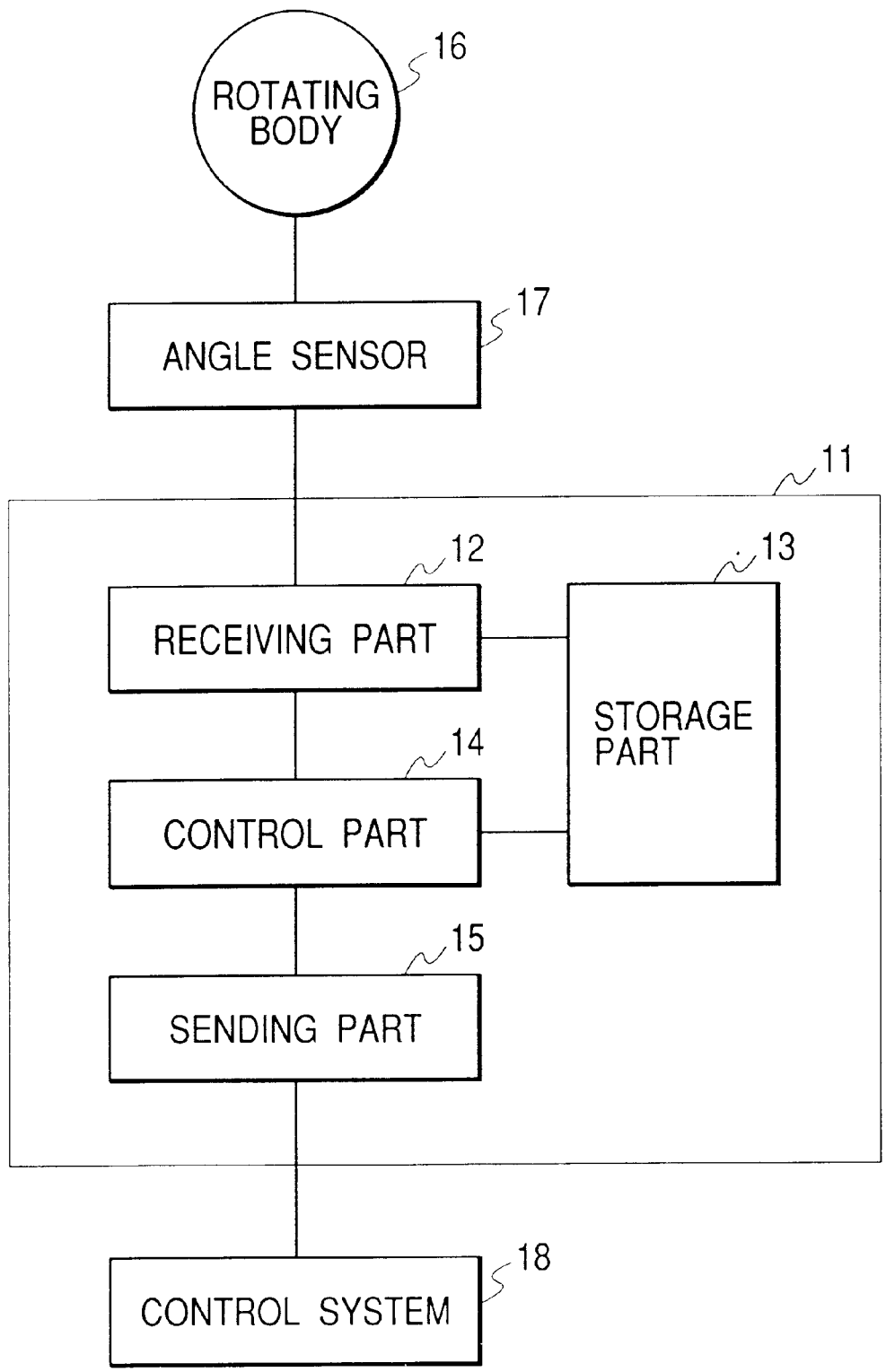
FIG. 1 is a diagram showing the construction of a rotation angular speed detection apparatus of the present invention.

FIG. 1 is a diagram showing the construction of a rotation angular speed detection apparatus of the present invention.

As shown in FIG. 1, a rotation angular speed detection apparatus 11 of the present invention has a receiving part 12, a storage part 13, a control part 14, and a sending part 15.

The receiving part 12 receives at predetermined time intervals an angular signal from an angle sensor 17 for detecting a rotation angle of a rotating body 16 such as a steering wheel with respect to the reference angle.

The storage part 13 stores at predetermined time intervals an angle based on the angular signal received by the receiving part 12.

The control part 14 divides a difference between the first angle of the rotation angles stored in the storage part 13 and the second angle stored before the first angle by the time required from storing of the second angle to storing of the first angle so as to detect a rotation angular speed.

The sending part 15 sends the rotation angular speed detected by the control part 14 to a vehicle stability control system 18.

In the rotation angular speed detection apparatus 11 thus constructed, the receiving part 12 receives the angular signal from the angle sensor 17, the storage part 13 stores an angle based on the received angular signal, the control part 14 detects a rotation angular speed detected from the stored angle, and the sending part 15 sends a rotation angular speed signal based on the detected rotation angular speed to the vehicle stability control system 18. The vehicle stability control system 18 performs various controls using the sent rotation angular speed signal.

Figure 2:
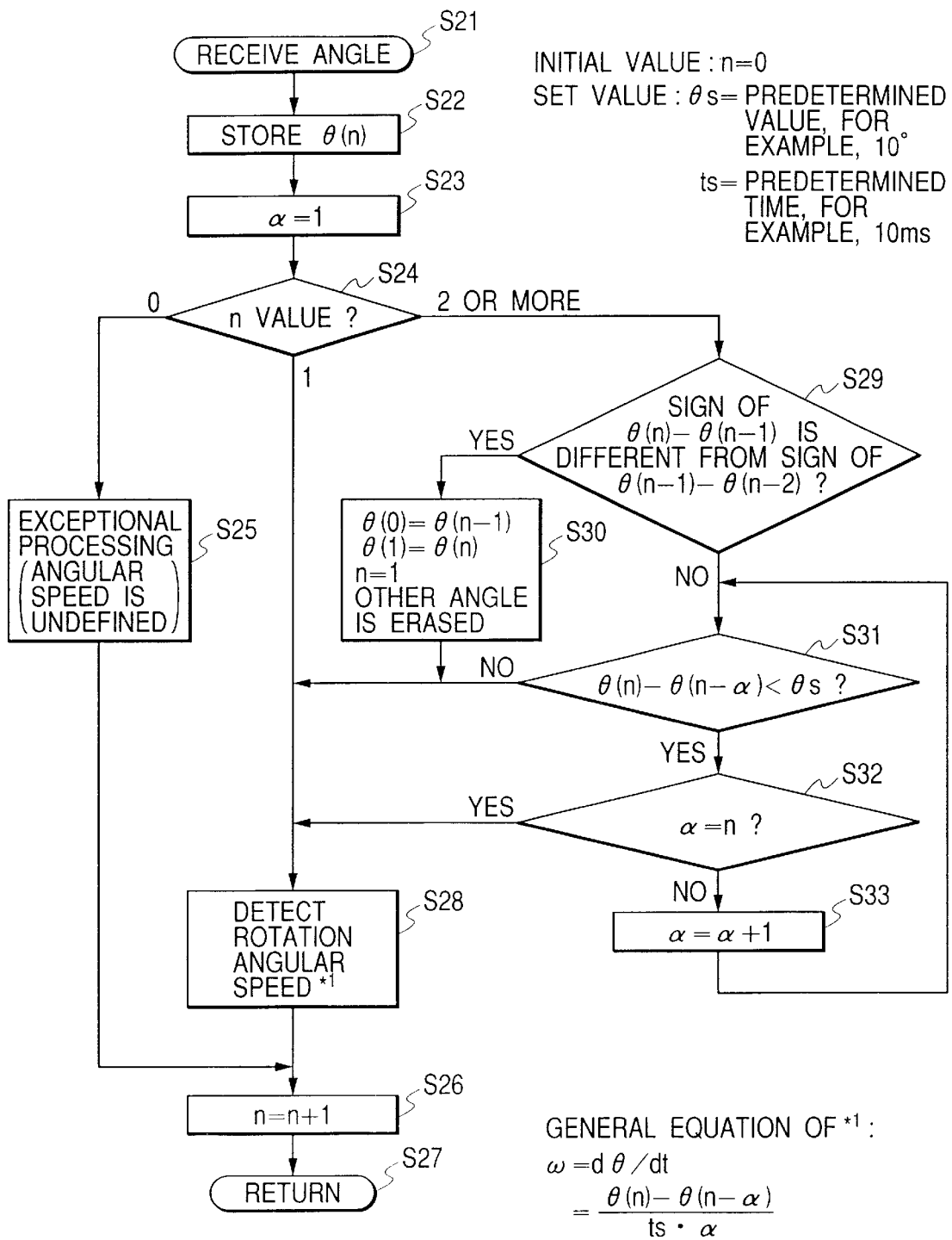
FIG. 2 is a flowchart showing a rotation angular speed detection method of the present invention.

FIG. 2 is a flowchart of assistance in explaining a method for detecting a rotation angular speed by the control part 14 of the rotation angular speed detection apparatus 11 of the present invention.

As shown in FIG. 2, the receiving part 12 receives the angular signal from the angle sensor 16 at intervals of predetermined time ts (e.g. , ts=10 ms) (S21) Then, the storage part 13 stores an angle θ (n) based on the angular signal received together with a counter n indicating the order of the angle to be stored (S22). The loop counter α is set to 1 (S23) which is then compared with the value of the counter n (S24).

In step S24, when the counter n is 0 (only the first time after the main power supply is turned on), a rotation angular speed cannot be obtained. The rotation angular speed is undefined (S25), and then, the counter n is incremented (S26) to end the routine (S27). When the counter n is 1, the equation of the rotation angular speed ω=(θ(1)−θ(0))/ts is calculated to detect a rotation angular speed (S28), and then, the counter n is incremented (S26) to end the routine (S27). When the counter n is 2 or more, a sign of a difference θ(n)−θ(n−1) between a first angle θ(n) latest-stored and a second angle θ(n−1) stored ts before the first angle θ(n) is compared with a sign of a difference θ(n−1)−θ(n−2) between the second angle θ(n−1) and an angle θ(n−2) stored ts before the second angle θ(n−1) (S29).

In step S29, when the sign of the difference θ(n)−θ(n−1) between the first angle and the second angle is different from the sign of the difference θ(n−1)−θ(n−2) between the second angle and the angle stored ts before the second angle (Y), the second angle θ(n−1) is θ(0), the first angle θ(n) is θ(1), the counter n is 1 (S30) The equation of the rotation angular speed ω=(θ(1)−θ(0))/ts is calculated to detect a rotation angular speed (S28) and then, the counter n is counted up (S26) to end the routine (S27). When the sign of the difference θ(n)−θ(n−1)between the first angle and the second angle is equal to the sign of the difference θ(n−1)−θ(n−2) between the second angle and the angle stored ts before the second angle (N), the difference |θ(n)−θ(n−α)| between the first angle θ(n) and an angle θ(n−α) stored ts·α before the first angle θ(n) is compared with a predetermine value θs (e.g., θs=10°) (S31).

In step S31, the difference |θ(n)−θ(n−α)| between the first angle and the angle stored ts α before the first angle is more than the predetermined value θs (N), for example, θ(n−α) is a third angle. The equation for dividing the difference θ(n)−θ(n−α) between the first angle and the third angle by the time ts α required from storing of the third angle to storing of the first angle, that is, the rotation angular speed ω=(θ(n)−θ(n−α))/(ts α) is calculated to detect a rotation angular speed (S28), and then, the counter n is incremented (S26) to end the routine (S27). The difference |θ(n)−θ(n−α) |between the first angle and the angle stored ts α before the first angle is less than the predetermined value θs (Y), the counter α is compared with the counter n (S32).

In step S32, the counter α is equal to the counter n (Y), an angle in which a difference between the first angle θ(n) and the angle is more than the predetermined value θs is not present in the stored angles. The oldest angle θ(0) of the stored angles is a fourth angle. The equation of the rotation angular speed ω=(θ(n)−θ(0))/(ts·α) is calculated to detect a rotation angular speed (S28), and then, the counter n is incremented (S26) to end the routine (S27). When the counter a and the counter n are not equal (N), the counter a is counted up (S33) to return the routine to step S31. The routine is repeated.

In the operation described above, a difference between the first angle of the stored angles and another one angle selected is divided by a difference in time storage of the two angles to detect a rotation angular speed.

In the present invention, when the difference between the first angle $\theta(n)$ and the second angle $\theta(n-1)$ is less than the predetermined value $\theta s$, the third angle $\theta(n-\alpha)$ in which the difference between the first angle $\theta(n)$ and the third angle $\theta(n-\alpha)$ is more than the predetermined value $\theta s$ is determined from the stored angles, and the difference $\theta(n)-\theta(n-\alpha)$ between the first angle and the third angle is divided by the time ts $\alpha$ required from storing of the third angle to storing of the first angle so as to detect the rotation angular speed. The rotation angular speed can be detected using a sufficiently large angle $\theta s$ (e.g., 10° or more) as compared with an error (the total of a measurement error of the rotation angle due to the accuracy of the angle sensor, an error at reception due to electric delay, and an error at converting an analog signal to a digital signal, e.g., 0.2°). The rotation angular speed having high accuracy (e.g., an error rate of below 2%) can be detected.

The step S32 is a process when the angle in which the difference between the first angle $\theta(n)$ and the angle is more than the predetermined value $\theta s$ is not present in the stored angles. In the step, when the angle in which the difference between the first angle $\theta(n)$ and the angle is more than the predetermined value $\theta s$ is not present, an arbitrary angle of the stored angles, such as the oldest angle $\theta(0)$ of the stored angles is a fourth angle, for example. The equation of the rotation angular speed $\omega=(\theta(n)-\theta(0))/(ts\alpha)$ is calculated to detect the rotation angular speed. When the rotating body 16 is hardly rotated, the difference is divided by the longest time interval (ts $\alpha$) for storing the stored angles. The error rate is low (the difference is divided by ts in the prior art, so that the error rate is $1/\alpha$ as compared with the prior art) so as to detect the rotation angular speed having high accuracy. The arbitrary angle of the angles stored before the first angle $\theta(n)$ is selected from the angles stored in the storage part 13 as the fourth angle. The error rate can be reduced as compared with the prior art rotation angular speed apparatus so as to naturally detect the rotation angular speed having high-accuracy.

The steps S29 and S30 are processes when the rotation direction of the rotating body 16 is reversed. The two steps erase the angles before the rotation direction of the rotating body 16 is reversed. When determining an angle in which the difference between the first angle $\theta(n)$ and the angle is more than the predetermined value $\theta s$, the routine does not go back to the angle before the rotation direction is reversed. When the rotating body 16 frequently repeats forward/rearward rotation within a short time, soon after the forward/rearward direction of the rotating body 16 is switched, the forward/rearward rotation direction of the rotation angular speed of the rotating body 16 can be detected correctly.

Figure 3:
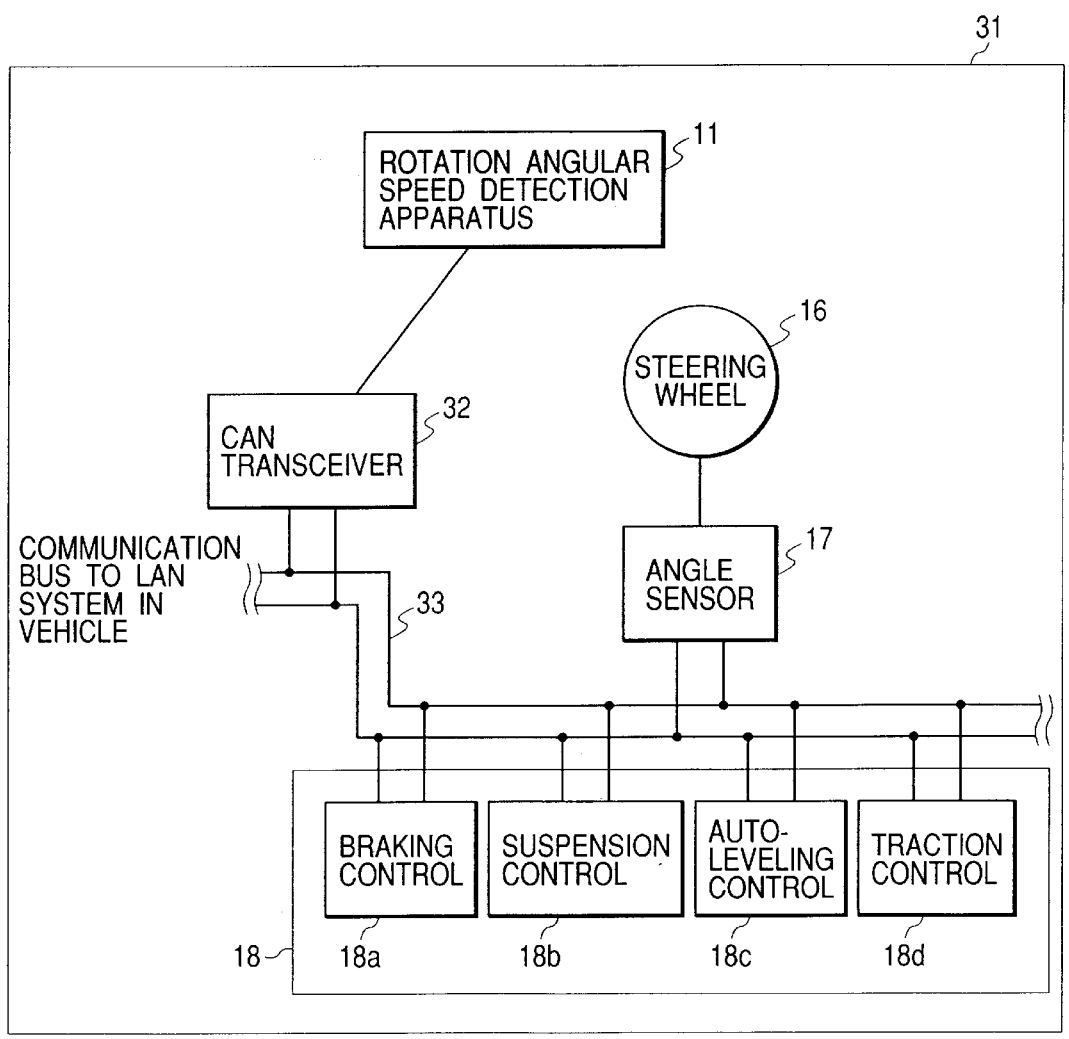
FIG. 3 is a diagram showing the construction of an automobile of the present invention.

FIG. 3 is a diagram showing the construction of an automobile using the rotation angular speed detection apparatus 11 of the present invention. In FIG. 3, the same constructions as in FIG. 1 are indicated by similar numerals, and the detailed description thereof is omitted.

As shown in FIG. 3, an automobile 31 of the present invention has the rotation angular speed detection apparatus 11 and the vehicle stability control system 18 for stabilizing a vehicle.

The rotation angular speed detection apparatus 11 receives an angular signal from the angle sensor 17 for detecting the rotation angle of the steering wheel 16 as the rotating body with respect to the reference angle so as to detect a rotation angular speed of the steering wheel 16, and then, sends a rotation angular speed signal based on the detected rotation angular speed to the vehicle stability control system 18.

The vehicle stability control system 18 is a control system for safely driving a vehicle including braking control 18a, suspension control 18b, auto-leveling control 18c, and traction control 18d. The vehicle stability control system 18 receives a rotation angular speed signal based on the rotation angular speed of the steering wheel 16 detected by the rotation angular speed detection apparatus 11. Then, the vehicle stability control system 18 predicts the traveling direction intended by the driver (the direction to finish turning the steering wheel) from the rotation angular speed of the steering wheel 16 based on the received rotation angular speed signal so as to safely control the vehicle.

In addition, the rotation angular speed detection apparatus 11. is connected through a CAN (Controller Area Network) transceiver 32 to a communication BUS 33 to a LAN system in the vehicle as a multiplex transmission path, so as to be mutually communicated with the vehicle stability control system 18 also connected to the communication BUS 33 or with a vehicle speed sensor 49 for detecting the speed of the vehicle.

Figure 4:
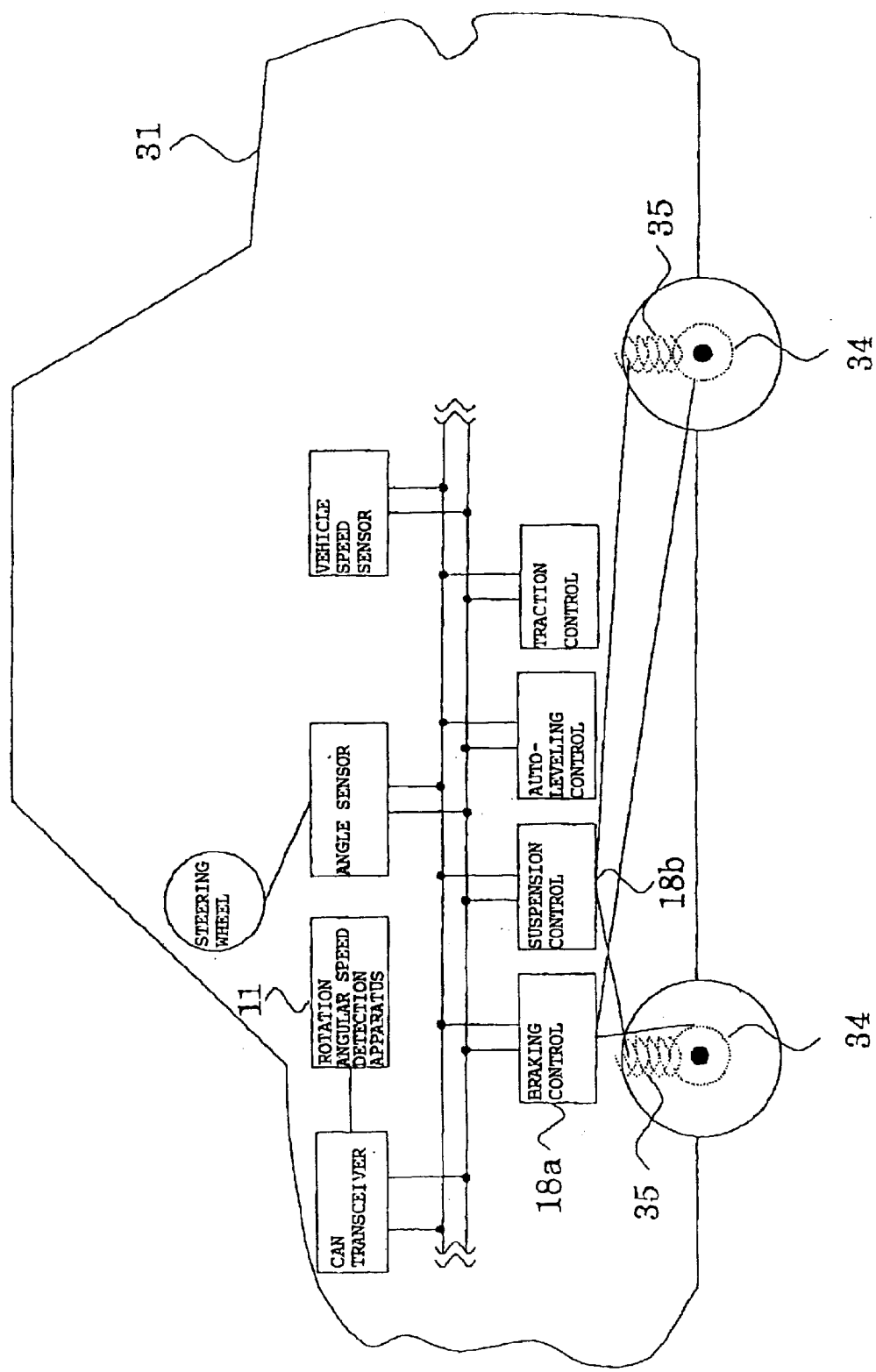
FIG. 4 is a diagram showing an embodiment of the automobile of the present invention.

FIG. 4 is a diagram showing an embodiment of the automobile 31 of the present invention. As shown in FIG. 4, for example, a sending signal from the rotation angular speed detection apparatus 11 is received by the braking control 18a for controlling front/rear brakes 34. Then, a control signal sent from the braking control 18a controls the front/rear brakes 34. In addition, the sending signal from the rotation angular speed detection apparatus 11 is received by the suspension control 18b for controlling front/rear suspensions 35. A control signal sent from the suspension control 18b controls the front/rear suspensions 35. The total vehicle stability control is performed in this manner.

The automobile 31 uses the rotation angular speed detection apparatus 11 of the present invention. An error is reduced when the traveling direction intended by the driver is predicted, so that the suitable vehicle stability control is possible. The automobile 31 can thus be driven more safely.

As described above, according to the present invention, a rotation angular speed detection apparatus comprises: a receiving part for receiving an angular signal at predetermined time intervals from a rotation angle sensor for detecting a rotation angle of a rotating body with respect to the reference angle; a storage part for storing the rotation angle based on the received angular signal; and a control part for dividing a difference between a first arbitrary angle of the rotation angles stored in the storage part and a second angle stored before the first angle by the time required from storing of the second angle to storing of the first angle so as to detect a rotation angular speed; wherein when the difference between the first angle and the second angle is less than a predetermined value, the control part determines, from the angles stored in the storage part, a third angle stored before the second angle in which a difference between the first angle and the third angle is more than the predetermined value, and wherein the control part divides the difference between the first angle and the third angle by the time required from storing of the third angle to storing of the first angle so as to detect a rotation angular speed. The present invention can divide the difference between the rotation angles so as to reduce an error and detect a rotation angular speed having high accuracy.

According to the present invention, an automobile comprises: the rotation angular speed detection apparatus; and a vehicle stability control system for stabilizing a vehicle; wherein the rotation angular speed detection apparatus receives an angular signal from an angle sensor detecting a rotation angle of a steering wheel so as to detect a rotation angular speed of the steering wheel, and wherein a rotation angular speed signal based on the detected rotation angular speed is sent to the vehicle stability control system. The present invention can provide an automobile which can predict the traveling direction intended by the driver more precisely and permits suitable vehicle stability control.

What is claimed is:

1. A rotation angular speed detection apparatus comprising:

a receiving part to receive an angular signal at predetermined time intervals from a rotation angle sensor that detects a rotation angle of a rotating body with respect to a reference angle;

a storage part to store the rotation angle based on the received angular signal; and a control part to divide a difference between a first arbitrary angle of the rotation angles stored in the storage part and a second angle stored before the first angle by a time required from storing of the second angle to storing of the first angle to detect a rotation angular speed;

wherein when the difference between the first angle and the second angle is less than a predetermined value, the control part determines, from the rotation angles stored in the storage part, a third angle stored before the second angle in which a difference between the first angle and the third angle is more than the predetermined value, and wherein the control part divides the difference between the first angle and the third angle by a time required from storing of the third angle to storing of the first angle to detect the rotation angular speed.

2. The rotation angular speed detection apparatus according to claim 1, wherein when no difference between the first angle and any of the rotation angles stored in the storage part is more than the predetermined value, the control part selects an arbitrary rotation angle of the rotation angles stored before the first angle in the storage part as a fourth angle, and wherein the control part divides a difference between the first angle and the fourth angle by a time required from storing of the fourth angle to storing of the first angle to detect the rotation angular speed.

3. The rotation angular speed detection apparatus according to claim 2, wherein when a sign of the difference between the first angle and the second angle is reversed from a sign of a difference between the second angle and a rotation angle stored immediately before the second angle, the control part erases the rotation angles stored before the second angle of the rotation angles stored in the storage part.

4. A rotation angular speed detection method comprising:

detecting a rotation angle of a rotating body at predetermined time intervals;

storing the detected rotation angle;

determining a difference between a first arbitrary angle of the stored rotation angles and a second angle stored before the first angle; and detecting a rotation angle speed by dividing the difference by a time required from storing of the second angle to storing of the first angle to detect a rotation angular speed;

wherein when the difference is less than a predetermined value, a third angle stored before the second angle in which a difference between the first angle and the third angle is more than the predetermined value, is determined from the stored rotation angles, and the difference between the first angle and the third angle is divided by a time required from storing of the third angle to storing of the first angle to detect the rotation angular speed.

5. The rotation angular speed detection method according to claim 4, wherein when no difference between the first angle and any rotation angle of the stored rotation angles is more than the predetermined value, an arbitrary rotation angle of the stored rotation angles before the first angle is selected as a fourth angle;

wherein a difference between the first angle and the fourth angle is divided by a time required from storing of the fourth angle to storing of the first angle to detect the rotation angular speed.

6. The rotation angular speed detection method according to claim 5, wherein when a sign of the difference between the first angle and the second angle is reversed from a sign of a difference between the second angle and a rotation angle stored immediately before the second angle, the angles stored before the second angle of the stored rotation angles are erased.

7. An automobile comprising:

the rotation angular speed detection apparatus according to claim 1; and a vehicle stability control system to stabilize a vehicle;

wherein the rotation angular speed detection apparatus receives an angular signal from an angle sensor detecting a rotation angle of a steering wheel to detect a rotation angular speed of the steering wheel, and wherein a rotation angular speed signal based on the detected rotation angular speed of the steering wheel is sent to the vehicle stability control system.

8. The rotation angular speed detection apparatus according to claim 7, wherein when no difference between the first angle and any of the rotation angles stored in the storage part is more than the predetermined value, the control part in the rotation angular speed detection apparatus selects an arbitrary rotation angle of the rotation angles stored before the first angle in the storage part as a fourth angle, and wherein the control part divides a difference between the first angle and the fourth angle by a time required from storing of the fourth angle to storing of the first angle to detect the rotation angular speed of the steering wheel.

9. The rotation angular speed detection apparatus according to claim 8, wherein when a sign of the difference between the first angle and the second angle is reversed from a sign of a difference between the second angle and a rotation angle stored immediately before the second angle, the control part erases the rotation angles stored before the second angle of the rotation angles stored in the storage part.

* * * * *